United States Patent
Molinari et al.

(10) Patent No.: US 12,512,277 B2
(45) Date of Patent: Dec. 30, 2025

(54) CHELATOR-IN-IONIC LIQUID ELECTROLYTES

(71) Applicant: President and Fellows of Harvard College, Cambridge, MA (US)

(72) Inventors: Nicola Molinari, Cambridge, MA (US); Boris Kozinsky, Cambridge, MA (US)

(73) Assignee: President and Fellows of Harvard College, Cambridge, MA (US)

( * ) Notice: Subject to any disclaimer, the term of this patent is extended or adjusted under 35 U.S.C. 154(b) by 705 days.

(21) Appl. No.: 17/765,634

(22) PCT Filed: Oct. 2, 2020

(86) PCT No.: PCT/US2020/054030
§ 371 (c)(1),
(2) Date: Mar. 31, 2022

(87) PCT Pub. No.: WO2021/067770
PCT Pub. Date: Apr. 8, 2021

(65) Prior Publication Data
US 2023/0005672 A1    Jan. 5, 2023

Related U.S. Application Data

(60) Provisional application No. 62/910,025, filed on Oct. 3, 2019.

(51) Int. Cl.
*H01G 11/62* (2013.01)
*H01G 11/60* (2013.01)
(Continued)

(52) U.S. Cl.
CPC ............ *H01G 11/62* (2013.01); *H01G 11/60* (2013.01); *H01G 11/64* (2013.01);
(Continued)

(58) Field of Classification Search
CPC ........ H01G 11/62; H01G 11/60; H01G 11/64; H01M 10/052; H01M 10/0567; H01M 10/0569; H01M 2300/0045
See application file for complete search history.

(56) References Cited

U.S. PATENT DOCUMENTS

2004/0081894 A1* 4/2004 Nimon ............... H01M 6/162
429/119
2010/0137175 A1 6/2010 Kunz et al.
(Continued)

FOREIGN PATENT DOCUMENTS

CN      108155415 A  *  6/2018
JP       5254123 B2       8/2013

OTHER PUBLICATIONS

Ackermann, "Chelating Additives Reversing the Lithium Migration Direction in Ionic Liquid Electrolytes", 2021, J. Phys. Chem. C, 125, 1, 266-274, https://doi.org/10.1021/acs.jpcc.0c09828 (Year: 2021).*

(Continued)

*Primary Examiner* — Nicholas A Smith
*Assistant Examiner* — Ziheng Lu
(74) *Attorney, Agent, or Firm* — Clark & Elbing LLP

(57) ABSTRACT

The invention provides electrolyte compositions including a metal cation, an ionic liquid, and a chelator that coordinates the metal cation. The electrolyte compositions are advantageous as they exhibit increased ion transference, and thus increased total conductivity, relative to a pure ionic liquid electrolyte that coordinates the metal cation. The invention provides a general strategy to control the cation-anion dynamics that govern ionic liquid performance. Electrolytes of the invention may be useful for any suitable purpose, e.g., in primary and secondary batteries, supercapacitors, and solar cells.

13 Claims, 7 Drawing Sheets

(51) Int. Cl.
  H01G 11/64 (2013.01)
  H01M 10/052 (2010.01)
  H01M 10/0567 (2010.01)
  H01M 10/0568 (2010.01)
  H01M 10/0569 (2010.01)
(52) U.S. Cl.
  CPC ..... H01M 10/052 (2013.01); H01M 10/0567 (2013.01); H01M 10/0568 (2013.01); H01M 10/0569 (2013.01); *H01M 2300/0045* (2013.01)

(56) References Cited

U.S. PATENT DOCUMENTS

| | | | |
|---|---|---|---|
| 2016/0031843 A1 | 2/2016 | Socha et al. | |
| 2017/0229737 A1* | 8/2017 | Seo | H01M 10/0569 |
| 2017/0346137 A1 | 11/2017 | Chang et al. | |
| 2017/0365883 A1* | 12/2017 | Luski | H01M 10/0567 |

OTHER PUBLICATIONS

Bayley, "Undoing Lithium Ion Association in Ionic Liquids through the Complexation by Oligoethers", 2010, J. Phys. Chem. C, 114, 48, 20569-20576, https://doi.org/10.1021/jp104957j (Year: 2010).*
Deshpande, "Enhancement of Lithium Ion Mobility in Ionic Liquid Electrolytes in Presence of Additives", 2013, J. Phys. Chem. C, 117, 48, 25343-25351, https://doi.org/10.1021/jp409498w (Year: 013).*
Armand et al., Materials For Sustainable Energy: A Collection of Peer-Reviewed Research and Review Articles from Nature Publishing Group; World Scientific, 2010; pp. 129-137 (10 pages).
Balducci et al., "High temperature carbon-carbon supercapacitor using ionic liquid as electrolyte." Journal of Power Sources 165(2): 922-927 (2007) (8 pages).
Balducci et al., "Ionic liquids for hybrid supercapacitors." Electrochemistry communications 2004, 6, 566-570 (6 pages).
Balducci, Andrea "Ionic liquids in Lithium-ion batteries." Topics in Current Chemistry 375:20 (Feb. 2, 2017) (27 pages).
Chen et al., "High performance supercapacitors based on reduced graphene oxide in aqueous and ionic liquid electrolytes." Carbon 49: 573-580 (2011) (8 pages).
Dokko, et al. Solvate ionic liquid electrolyte for Li—S batteries. Journal of The Electrochemical Society. 160(8): A1304-A1310 (Jun. 6, 2013) (8 pages).
Gadzekpo et al., "1, 4, 7, 10-Tetraoxacyclododecane (12-crown-4) as neutral carrier for lithium ion in lithium ion selective electrode." Analytical letters. 16(17-18): 1371-1380 (1983) (11 pages).
Gouverneur et al., "Negative effective Li transference numbers in Li salt/ionic liquid mixtures: does Li drift in the "Wrong" direction?" Physical Chemistry Chemical Physics.20: 7470-7478 (2018) (9 pages).
Kim et al., "High-performance supercapacitors based on poly (ionic liquid)-modified graphene electrodes." ACS Nano.5: 436-442 (2010) (7 pages).
Lewandowski et al., "Ionic liquids as electrolytes for Li-ion batteries—an overview of electrochemical studies." Journal of Power sources. 194: 601-609 (Jul. 7, 2009) (9 pages).
MacFarlane et al., "Energy applications of ionic liquids." Energy & Environmental Science. 7: 232-250 (2014) (22 pages).
Molinari et al. "Chelation-Induced Reversal of Negative Cation Transference Number in Ionic Liquid Electrolytes," Journal of Physical Chemistry B. 124(13) (Mar. 2020) (9 pages).
Molinari et al., "Effect of Salt Concentration on Ion Clustering and Transport in Polymer Solid Electrolytes: A Molecular Dynamics Study of PEO-LiTFSI." Chemistry of Materials. 30: 6298-6306 (2018) (9 pages).
Molinari et al., "General Trend of Negative Transference Number in Li Salt/Ionic Liquid Mixtures." (Feb. 2019) (21 pages).
Molinari et al., "Transport Anomalies Emerging from Strong Correlation in Ionic Liquid Electrolytes," Journal of Power Sources. 428:27-36 (Apr. 2019).
Olivier-Bourbigou, et al., "Ionic liquids: perspectives for organic and catalytic reactions." Journal of Molecular Catalysis A: Chemical. 182(1): 419-437 (2002) (20 pages).
Pedersen, Charles J. "Cyclic polyethers and their complexes with metal salts." Journal of the American Chemical Society 89(10). (May 10, 1967) (2 pages).
Watanabe et al., "Application of ionic liquids to energy storage and conversion materials and devices." Chemical reviews. 117: 7190-7239 (2017) (50 pages).
Xu et al., "Ionic liquids: ion mobilities, glass temperatures, and fragilities." The Journal of Physical Chemistry B. 107: 6170-6178 (May 31, 2003) (9 pages).
Xu, Nonaqueous liquid electrolytes for lithium-based rechargeable batteries. Chemical reviews. 104: 4303-4417 (2004) (117 pages).
Yang et al., Ionic liquids and derived materials for lithium and sodium batteries. Chemical Society Reviews. 2020-2064 (2018) (46 pages).
Zakeeruddin et al., "Solvent-free ionic liquid electrolytes for mesoscopic dye-sensitized solar cells." Advanced Functional Materials 19: 2187-2202 (2009) (16 pages).

* cited by examiner (a) [Emim]⁺

(b) [TFO]⁻

(c) [HCOO]⁻

(d) [TFSI]⁻

(e) 12-crown-4

(f) 18-crown-6

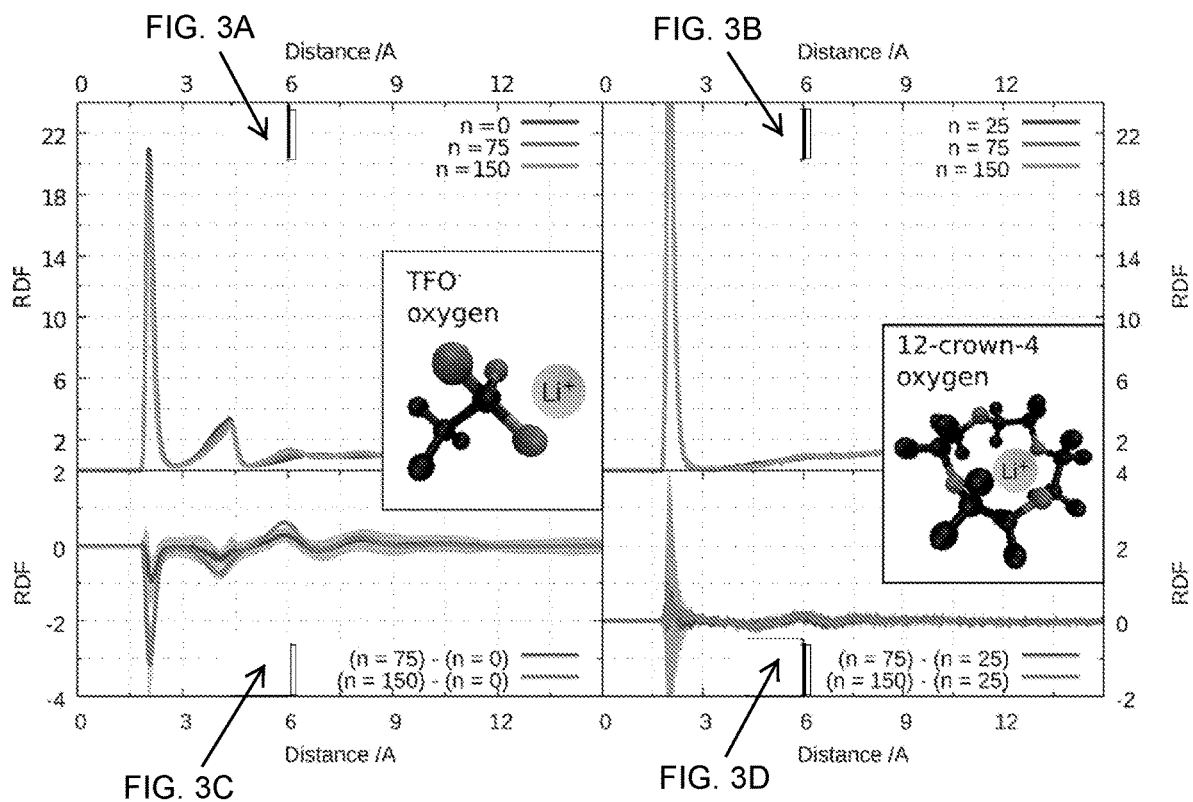

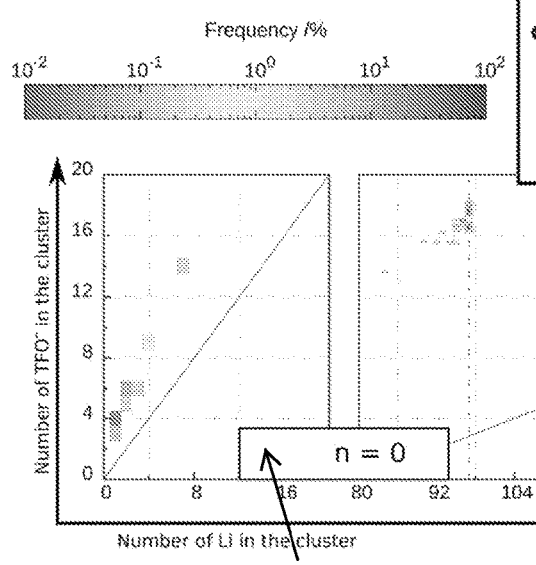
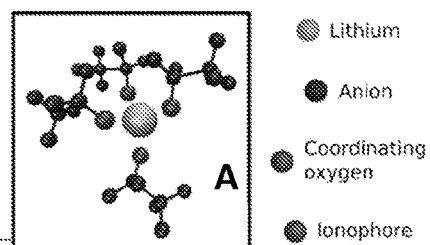
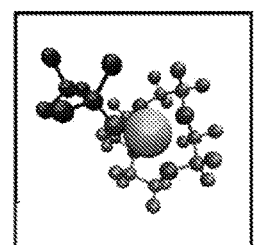
FIG. 4A  FIG. 4B  FIG. 4C  FIG. 4D

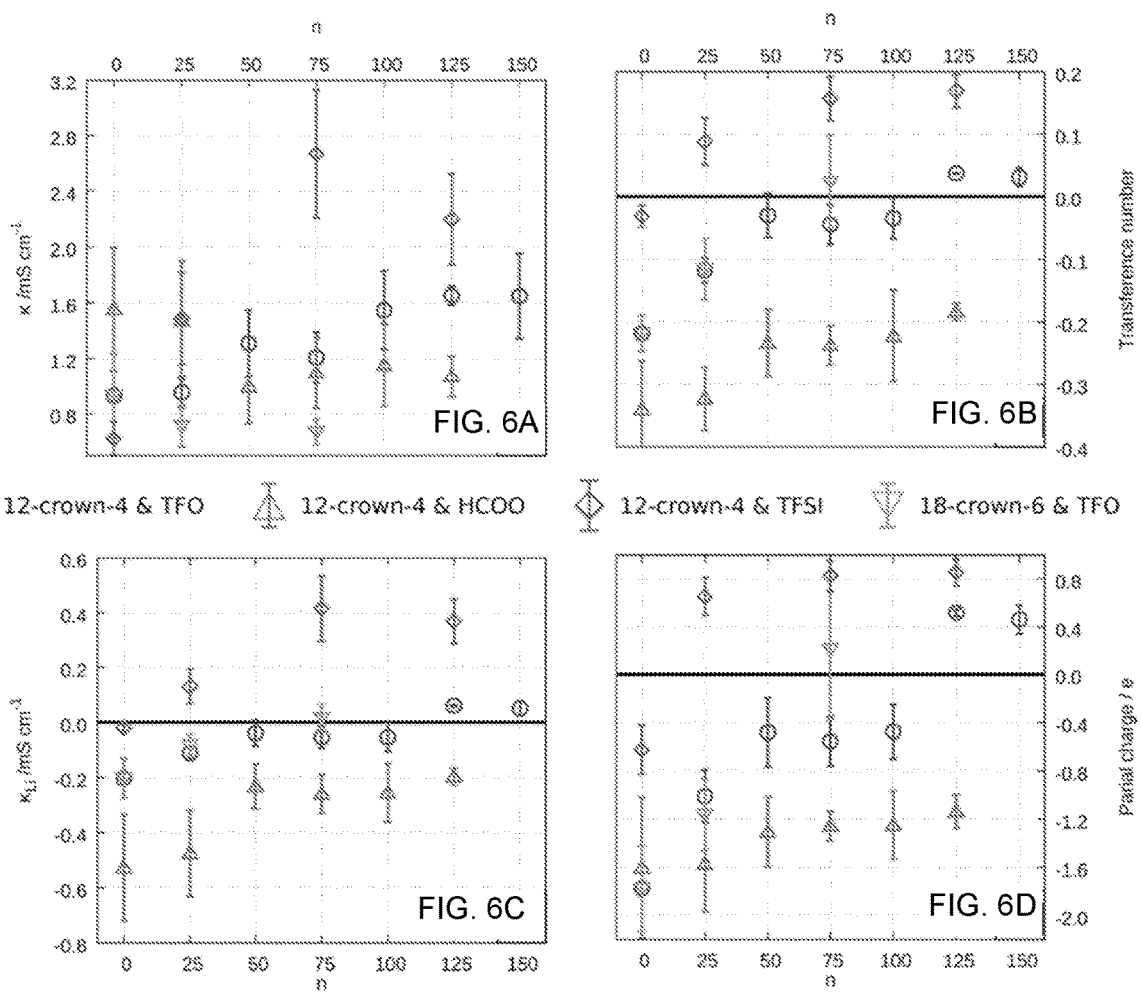

CHELATOR-IN-IONIC LIQUID ELECTROLYTES

FIELD OF THE INVENTION

The invention is directed to electrolytes with enhanced ion transport properties.

BACKGROUND OF THE INVENTION

Ionic liquids (ILs) are of scientific and technological interest thanks to their vast applicability as tailored solvents,[1,2] catalysts,[3-5] and electrolytes for solar cells, batteries and supercapacitors.[6-14] Focusing on the latter application, the low volatility, low flammability, and higher chemical and thermal stability as compared to conventional organic solvents are the properties that make ILs, and in particular room temperature ILs, attractive for technological applications as electrolytes.[6,15-18] On the other hand, their viability as electrolytes is threatened by their relatively poor transport properties, namely ionic conductivity and transference number, the latter repeatedly reported to be negative for a vast range of chemistries and alkali-salt concentrations.[19-21]

Accordingly, new electrolyte compositions with enhanced ion transport properties would be useful.

SUMMARY OF THE INVENTION

The invention features an electrolyte including a metal cation, an ionic liquid, and a chelator that coordinates the metal cation. In embodiments, the metal cation is selected from the group consisting of Na, Li, K, Ca, Mg, Zn, Ag, Cu, and V, such as Li or Na. In embodiments, the ionic liquid includes N-alkylimidazolium, N-alkylpyridinium, N-alkylpyrrolidinium, or N-alkylammonium, N-alkylpiperidinium, alkylphosphonium, N-alkylpyrazinium, or a quaternary amine. For example, the ionic liquid can include 1-ethyl-3-methylimidazolium (EMIM), 1-butyl-3-methylimidazolium (BMIM), 1-hexyl-3-methylimidazolium (HMIM), or 1-methyl-3-propylimidazolium (MPIM), in particular EMIM. In embodiments, the ionic liquid includes a halide, $C_{1-6}$ carboxylate, triflate, chlorate, bistriflimide (TFSI$^-$), bis(fluorosulfonyl)imide (FSI$^-$), $PF_6^-$, $BF_4^-$, or N-alkylsulfate, in particular triflate or formate. In embodiments, the chelator is selected from the group consisting of optionally substituted $C_{8-20}$ crown ethers, optionally substituted $C_{8-20}$ azacrown ethers, optionally substituted $C_{8-20}$ thiacrown ethers, optionally substituted $C_{6-20}$ podands, optionally substituted calix[n]arenes, and optionally substituted calix[n]crowns, wherein n is from 4-8. In embodiments, the chelator is one of lithium ionophores I-IV and VI-VIII or a species of formula (a) through (m):

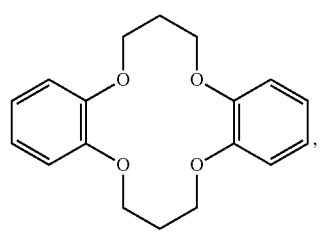

(a)

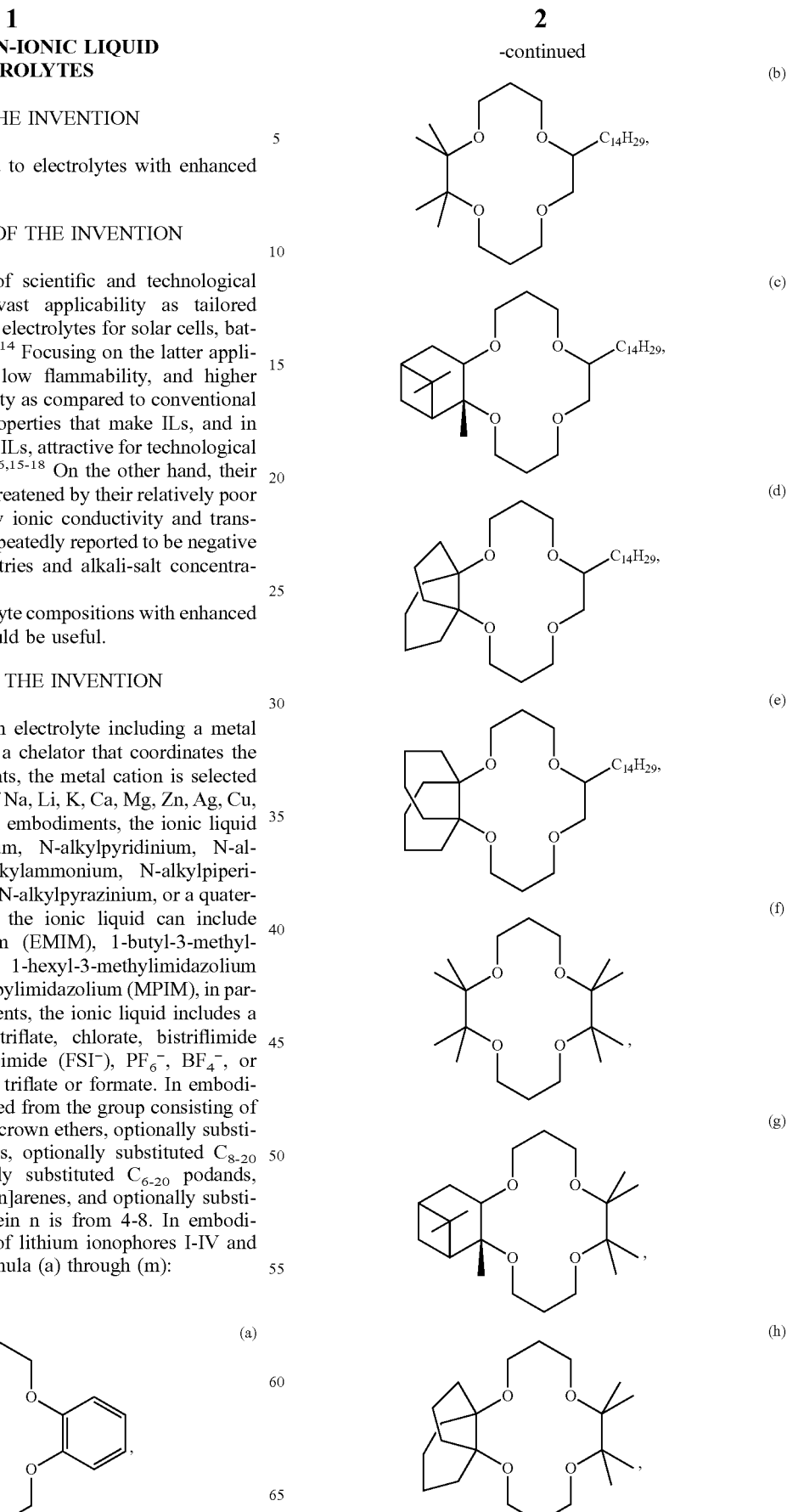

-continued

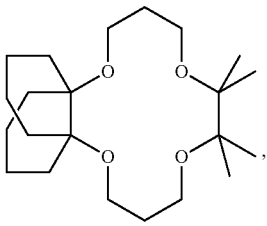, (i)

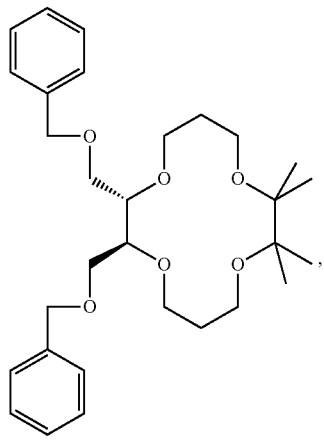, (j)

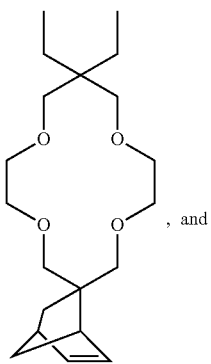, and (k)

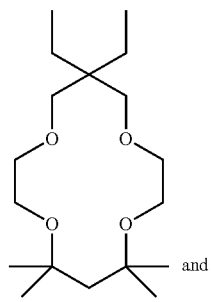 and (l)

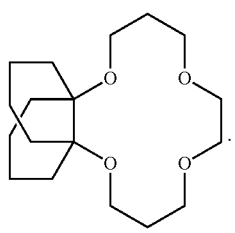. (m)

In embodiments, the chelator is optionally substituted 12-crown-4, optionally substituted 18-crown-6, or optionally substituted 14-crown-4 or an azacrown or thiacrown derivative thereof.

In embodiments, the optionally substituted $C_{6-20}$ podand is a glyme or an aza- or thia-derivative thereof. In embodiments, the glyme is triglyme.

The invention also includes an energy storage device, e.g., a battery or capacitor, or a solar cell including the electrolyte of the invention and methods of operating such energy storage devices or solar cells to provide power.

Definitions

The term "alkyl," as used herein, refers to substituted and unsubstituted straight chain and branched chain saturated groups from 1 to 20 carbons, unless otherwise specified. Alkyl groups can be saturated or unsaturated and are exemplified by methyl, ethyl, n- and iso-propyl, n-, sec-, iso- and tert-butyl, neopentyl, ethenyl, 1-propenyl, 2-propenyl, 2-methyl-1-propenyl, 1-butenyl, 2-butenyl, ethynyl, 1-propynyl, and the like and may be optionally substituted with one, two, three, or, in the case of alkyl groups of two carbons or more, four substituents independently selected from the group consisting of: alkoxy; amino; aryl; aryloxy; carboxyl; cycloalkyl; cycloalkyloxy; halo; heterocyclyl; (heterocyclyl)oxy; hydroxyl (—OH); nitro; phosphoryl; phosphonyl; oxo (═O); sulfonyl; thioalkoxy; thiol (—SH); —$CO_2R^A$, where $R^A$ is selected from the group consisting of (a) alkyl, (b) aryl, and (c) hydrogen; $C(O)NR^BR^C$, where each of $R^B$ and $R^C$ is, independently, selected from the group consisting of (a) hydrogen, (b) alkyl, and (c) aryl, or any ion thereof. In some embodiments, each of these substituent groups can be further substituted as described herein.

The term "alkoxy," as used herein, represents a group of formula —OR, wherein R is an alkyl group, as defined herein. The alkyl group can be substituted as described herein.

The term "alkylene," as used herein, refers to a divalent alkyl group. An alkylene may be substituted like an alkyl group.

The term "amino," as used herein, represents —$N(R^{N1})_2$, wherein each $R^{N1}$ is, independently, H, OH, alkyl, alkoxy, aryl, cycloalkyl, or heterocyclyl, or two $R^{N1}$ combine to form a heterocyclyl.

The term "aryl," as used herein, represents a mono-, bicyclic, or multicyclic carbocyclic ring system having one aromatic ring and is exemplified by phenyl, naphthyl, 1,2-dihydronaphthyl, 1,2,3,4-tetrahydronaphthyl, fluorenyl, indanyl, indenyl, and the like, and may be optionally substituted with one, two, three, four, or more substituents independently selected from the group consisting of: alkyl; alkoxy; amino; aryl; aryloxy; carboxyl; cycloalkyl; cycloalkyloxy; halo; heterocyclyl; (heterocyclyl)oxy; hydroxyl (—OH); nitro; phosphoryl; phosphonyl; sulfonyl; thioalkoxy; thiol (—SH); —$(CH_2)_qCO_2R^A$, where q is an integer from zero to four, and $R^A$ is selected from the group consisting of (a) alkyl, (b) aryl, and (c) hydrogen; $CONR^BR^C$, where $R^B$ and $R^C$ are independently selected from the group consisting of (a) hydrogen, (b) alkyl, and (c) aryl. In some embodiments, each of these groups can be further substituted as described herein. Aryl substituents may be monovalent, bivalent, or fused.

The term "aryloxy," as used herein, represents an aryl group, as defined herein, attached to the parent molecular group through an oxygen atom. In some embodiments, the aryl group can be substituted as defined herein.

The term "azacrown ether," as used herein represents a group formed by replacing one or more ring oxygen atoms of a crown ether with a nitrogen atom. Azacrown ethers may be substituted at the alkylene or nitrogen portions like a heterocyclyl group.

The term "halo," as used herein, represents a fluoro, chloro, bromo, or iodo.

The term "hydroxyl," as used herein, represents —OH.

The term "calix[n]arene," as used herein, represents a macrocyclic compound formed from the oligomerization of phenol, resorcinol, or pyrogallol. "n" represents the number of monomers of phenol, resorcinol, or pyrogallol used to form the macrocycle, and is from 4 to 8. A calix[n]arene may be substituted like a heterocyclyl group.

The term "calix[n]crown," as used herein, represents a calix[n]arene as defined herein where oxygen atoms in the calix[n]arene are bridged by one or more alkylene groups, e.g., —CH$_2$—CH$_2$—. "n" represents the number of monomers of phenol, resorcinol, or pyrogallol used to form the macrocycle, and is from 4 to 8. A calix[n]crown may be substituted like a heterocyclyl group.

The term "carboxyl," as used herein, represents —COOH. An exemplary ion of carboxyl is —COO$^-$.

The term "crown ether" as used herein represents a cyclic structure of oxygen atoms linked by alkylene groups. Crown ethers may be substituted like a heterocyclyl group.

The term "cycloalkyl," as used herein, represents a monovalent saturated or unsaturated non-aromatic cyclic hydrocarbon group from three to twenty carbons, unless otherwise specified. Cycloalkyl groups may be saturated or unsaturated and are exemplified by cyclopropyl, cyclobutyl, cyclopentyl, cyclohexyl, cycloheptyl, cyclopentenyl, cyclohexenyl, and the like. Cycloalkyl groups may be saturated or unsaturated. The cycloalkyl groups of this invention can be optionally substituted with: alkyl; alkoxy; amino; aryl; aryloxy; carboxyl; cycloalkyl; cycloalkyloxy; halo; heterocyclyl; (heterocyclyl)oxy; hydroxyl (—OH); nitro; oxo; phosphoryl; phosphonyl; sulfonyl; thioalkoxy; thiol (—SH); —(CH$_2$)$_q$CO$_2$R$^A$, where q is an integer from zero to four, and R$^A$ is selected from the group consisting of (a) alkyl, (b) aryl, and (c) hydrogen; CONR$^B$R$^C$, where R$^B$ and R$^C$ are independently selected from the group consisting of (a) hydrogen, (b) alkyl, and (c) aryl. The term "cycloalkyl" also includes bicyclic, tricyclic, and tetracyclic fused ring structures, e.g., decalin and spiro cyclic compounds, and further includes bridged cycloalkyl groups, e.g., bicyclo[2.2.1]heptyl, and the like. Cycloalkyl substituents may be monovalent, bivalent, spiro, or fused.

The term "cycloalkyloxy," as used herein, represents a cycloalkyl group, as defined herein, attached to the parent molecular group through an oxygen atom. In some embodiments, the cycloalkyl group can be substituted as described herein.

The term "heterocyclyl," as used herein, represents a C$_{3-9}$ ring system containing one, two, three, or four heteroatoms independently selected from the group consisting of nitrogen, oxygen, and sulfur. A heterocyclyl may be saturated or unsaturated and aromatic or non-aromatic. The term "heterocyclyl" includes bicyclic, tricyclic, and tetracyclic groups in which any of the above heterocyclic rings is fused to one, two, or three carbocyclic rings, e.g., an aryl ring, a cyclohexane ring, a cyclohexene ring, a cyclopentane ring, a cyclopentene ring, or another monocyclic heterocyclic ring, such as indolyl, quinolyl, isoquinolyl, tetrahydroquinolyl, benzofuryl, benzothienyl and the like. Any of the heterocyclyl groups as described herein may be optionally substituted with one, two, three, four or more substituents independently selected from the group consisting of: alkyl; alkoxy; amino; aryl; aryloxy; carboxyl; cycloalkyl; cycloalkyloxy; halo; heterocyclyl; (heterocyclyl)oxy; hydroxyl (—OH); nitro; oxo; phosphoryl; phosphonyl; sulfonyl; thioalkoxy; thiol (—SH); —(CH$_2$)$_q$CO$_2$R$^A$, where q is an integer from zero to four, and R$^A$ is selected from the group consisting of (a) alkyl, (b) aryl, and (c) hydrogen; CONR$^B$R$^C$, where R$^B$ and R$^C$ are independently selected from the group consisting of (a) hydrogen, (b) alkyl, and (c) aryl. In some embodiments, each of these groups can be further substituted as described herein.

The term "(heterocyclyl)oxy," as used herein, represents a heterocyclyl group, as defined herein, attached to the parent molecular group through an oxygen atom. In some embodiments, the heterocyclyl group can be substituted as described herein.

The term "nitro," as used herein, represents —NO$_2$.

The term "oxo," as used herein, represents =O.

The term "phosphoryl," as used herein, represents —PO$_3$H$_2$. Exemplary ions of phosphoryl are —PO$_3$H$^-$ and —PO$_3^{2-}$.

The term "phosphonyl," as used herein, represents —PO$_3$R$_2$, wherein each R is independently H or alkyl, as defined herein. An exemplary ion of phosphoryl is —PO$_3$R$^-$.

The term "podand," as used herein, refers to a linear multidentate ligand including an acyclic polyether, e.g., acyclic oligomers of [—O—CH$_2$—CH$_2$]. The term also includes thia- and aza-derivates thereof, wherein one or more S or N atoms replaces an O atom. Examples include glymes, which are saturated polyethers.

The term "sulfonyl," as used herein, represents —SO$_3$H. An exemplary ion of sulfonyl is —SO$_3^-$.

The term "thioalkoxy," as used herein, refers to alkyl group attached to the parent molecular group through a sulfur atom. In some embodiments, the alkyl group can be substituted as described herein.

The term "thiacrown ether," as used herein represents a group formed by replacing one or more ring oxygen atoms of a crown ether with a sulfur atom. Thiacrown ethers may be substituted at the alkylene portions like a heterocyclyl group.

BRIEF DESCRIPTION OF THE DRAWINGS

FIG. 2A shows the absolute density values as a function of temperature and system composition for Li$^+$[EMIM]$^+$[TFO]$^-$-12-crown-4. FIG. 2B shows the percentage difference at 358K for both chemistries and different compositions. Ensemble uncertainty is always present but not always appreciable on the scale of the plot.

FIGS. 3A-3D: Radial distribution function (RDF) between Li$^+$ and oxygen atoms of [TFO]$^-$ (FIG. 3A), and Li$^+$ and oxygen atoms of 12-crown-4 (FIG. 3B). For both FIGS. 3A and 3B, three different compositions are shown. FIGS. 3C and 3D present the differences in RDF between the different compositions in FIGS. 3A and 3B, respectively. In all curves, the shaded area highlights the standard deviation among the ensemble of four structures for each composition.

FIGS. 4A-4D: Clustering between Li$^+$ atoms and [TFO]$^-$ molecules at different system compositions, i.e., different number n of added 12-crown-4 molecules. FIG. 4A is n=0, and FIG. 4B is n=150. Inset FIGS. 4C and 4D show an anion-only $(C_1;A_4)^{-3}$ cluster and an ionophore-disrupted $(C_1;A_1)^0$ cluster from an MD snapshot, respectively.

FIG. 5A shows the breakdown in oxygen coordination for three different compositions. FIG. 5B shows the dependence on the persistence of $Li^+$ coordination on the number of 12-crown-4 molecules.

FIGS. 6A-6D: Summary of the transport for all the compositions studied. FIG. 6A shows the total conductivity κ. FIG. 6B shows the $Li^+$ transference number $t^+_{Li}$. FIG. 6C shows $Li^+$ conductivity computed as $\kappa_{Li} = \kappa \cdot t^+_{Li}$. FIG. 6D shows the $Li^+$ effective charge.

FIG. 7 shows total conductivity κ (left y-axis) and transference number (right y-axis) against $O^{Ionophore}$ to Li ratio (x-axis).

DETAILED DESCRIPTION OF THE INVENTION

The invention provides electrolyte compositions containing a metal cation, an ionic liquid (IL), and a chelator, e.g., a cyclic chelator, that coordinates the metal cation. The electrolyte compositions of the invention are advantageous as they exhibit increased ion transference, and thus increased total conductivity, relative to a pure ionic liquid electrolyte that coordinates the metal cation. In the case of lithium, the addition of chelator effectively helps in "breaking" the $Li^+$-anion clusters by competing for the lithium coordination and causing positively-charged clusters as well as free $Li^+$ atoms to appear in the systems. This is in stark contrast with the results from the pure IL-based electrolytes, where all clusters contained a greater number of anion than cation, and no anion-free lithium was found. We further found that not only the overall cluster population is, on average, less asymmetrical, but also clusters are less persistent in time. In other words, the persistence of a given lithium coordination cage due to IL anions is progressively reduced the more chelator molecules are added to the systems, signaling a faster decoupling of the anion-cation motions. We also observed that all transport properties are improved by adding the chelator, as compared to the reference system with no added chelator. Of particular importance is the result showing increasing transference number when more chelators are added, to the point that even the sign of the transference number can be inverted from negative to positive, therefore significantly increasing the lithium contribution to the total conductivity. This invention provides a general strategy to control the cation-anion correlated dynamics that can be leveraged to improve the transport properties of IL-based electrolytes, providing improved designs of metal-salt/ionic liquid electrolytes.

Electrolytes of the invention may be employed for any suitable purpose, e.g., in primary and secondary batteries, supercapacitors, and solar cells.

Metal cations suitable for the electrolyte compositions of the present invention include, but are not limited to, Na, Li, K, Ca, Mg, Zn, Ag, Cu, and V. Exemplary metal cations are Li and Na.

Figure 1A:
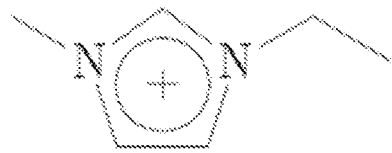
FIGS. 1A-1F: Molecular structure of the ionic liquid cation [EMIM]$^+$ (FIG. 1A), the [TFO]$^-$, [HCOO]$^-$, and [TFSI]$^-$ anions (FIGS. 1B, 1C, and 1D, respectively), and the 12-crown-4 (FIG. 1E) and 18-crown-6 (FIG. 1F) molecules.

Ionic liquids, which are salts in a liquid state, include a weakly associated cation and anion pair. Ionic liquid cations useful for the electrolyte compositions of the present invention include, but are not limited to, N-alkylimidazolium, N-alkylpyridinium, N-alkylpyrrolidinium, or N-alkylammonium, N-alkylpiperidinium, alkylphosphonium, N-alkylpyrazinium, and quaternary amines. An exemplary class of ionic liquids include the N-alkylimidazolium series, e.g., 1-ethyl-3-methylimidazolium (EMIM), 1-butyl-3-methylimidazolium (BMIM), 1-hexyl-3-methylimidazolium (HMIM), or 1-methyl-3-propylimidazolium (MPIM). An exemplary N-alkylimidazolium ionic liquid for electrolyte compositions of the present invention is EMIM. FIG. 1A shows the molecular structure of [EMIM]$^+$.

Figure 1B:
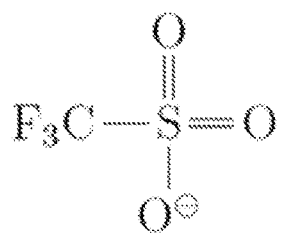
Figure 1C:
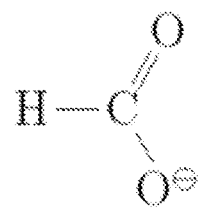
Figure 1D:
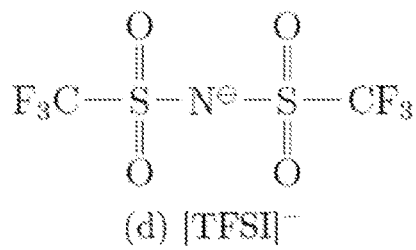
Figure 1E:
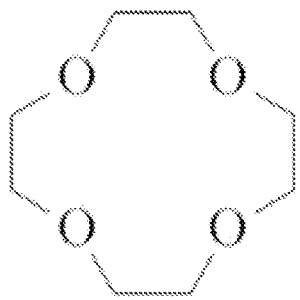
Figure 1F:
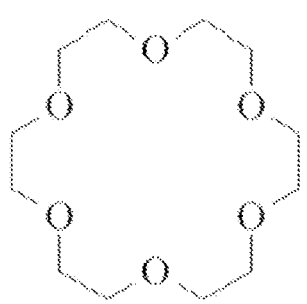

Ionic liquid anions useful for the electrolyte compositions of the present invention include, but are not limited to, halides (e.g., Cl$^-$, Br$^-$, F$^-$, or I$^-$), $C_{1-6}$ carboxylates (e.g., formate or acetate), triflate ($CF_3SO_3^-$, TFO$^-$), chlorate ($ClO_3^-$), bistriflimide ([($CF_3SO_2)_2N]^-$, TFSI$^-$), bis(fluorosulfonyl)imide ([($SO_2F)_2N]^-$, FSI$^-$), $PF_6^-$, $BF_4^-$, or N-alkylsulfate (e.g., lauryl sulfate or laureth sulfate). Exemplary ionic liquid anions are triflate and formate. FIGS. 1B-1D show molecular structures of the [TFO]$^-$ (FIG. 1B), [HCOO]$^-$ (FIG. 1C), and [TFSI]$^-$ (FIG. 1D) anions.

Chelators useful for electrolyte composition of the present invention include, but are not limited to, optionally substituted $C_{8-20}$ crown ethers, optionally substituted $C_{8-20}$ thiacrown ethers, optionally substituted $C_{8-20}$ azacrown ethers, optionally substituted $C_{6-20}$ podands (e.g., ethylene glycol diethyl ethers or ethylene glycol dimethyl ethers, e.g., diglyme, triglyme, tetraglyme, etc., or an aza- or thia-derivative thereof), optionally substituted calix[n]arenes, and optionally substituted calix[n]crowns, where n is from 4-8.

Examples of chelators include optionally substituted 12-crown-4, optionally substituted 14-crown-4, optionally substituted 18-crown-6, and azacrown and thiacrown derivatives thereof (i.e., where one or more of the ring oxygens is replaced by N or S), e.g., 12-crown-4, 14-crown-4, or 18-crown-6.

In some embodiments, the chelator is one of the series of lithium ionophores I-IV or VI-VIII:

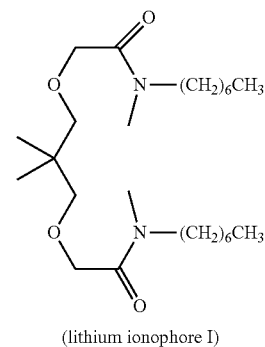

(lithium ionophore I)

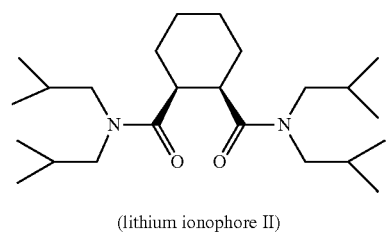

(lithium ionophore II)

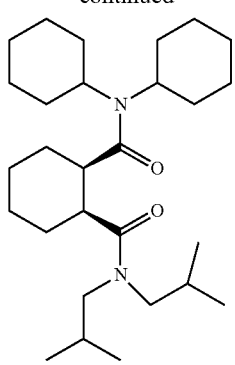
(lithium ionophore III)
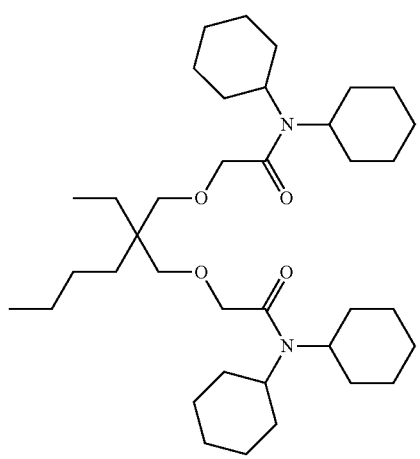
(lithium ionophore IV)
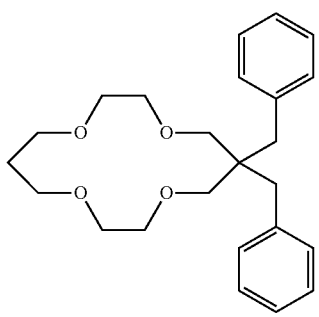
(lithium ionophore VI)
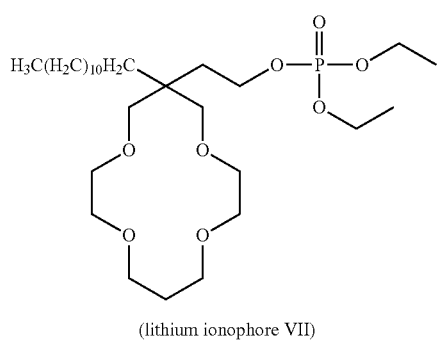
(lithium ionophore VII)
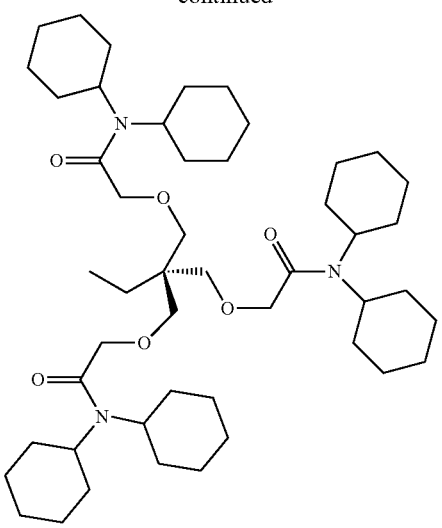
(lithium ionophore VIII)
In some embodiments, the chelator is one of formulas (a) through (m):
(a)
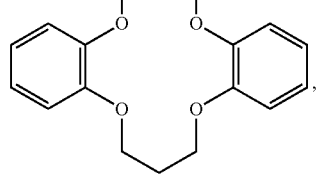
(b)
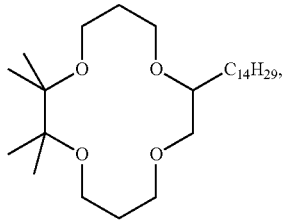
(c)
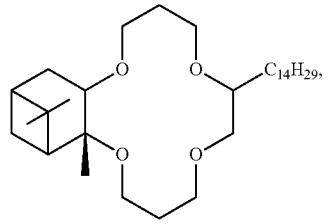
(d)
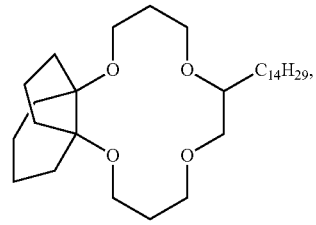

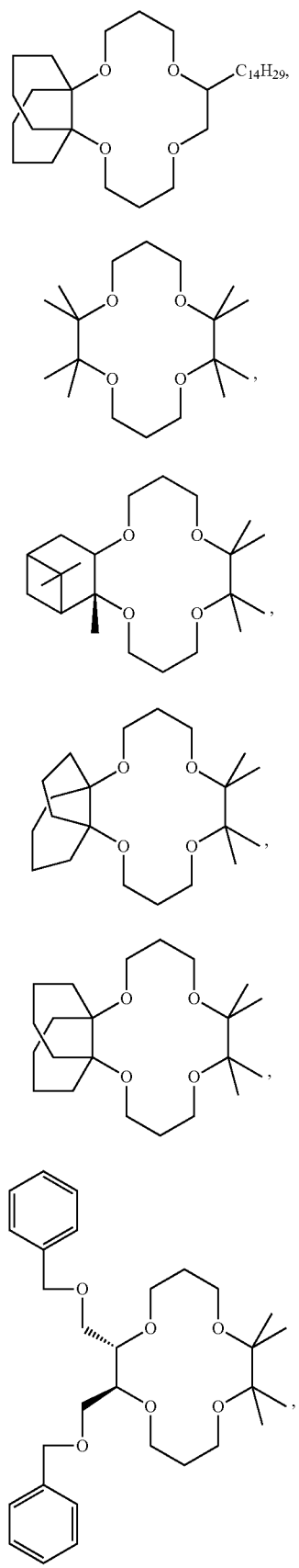

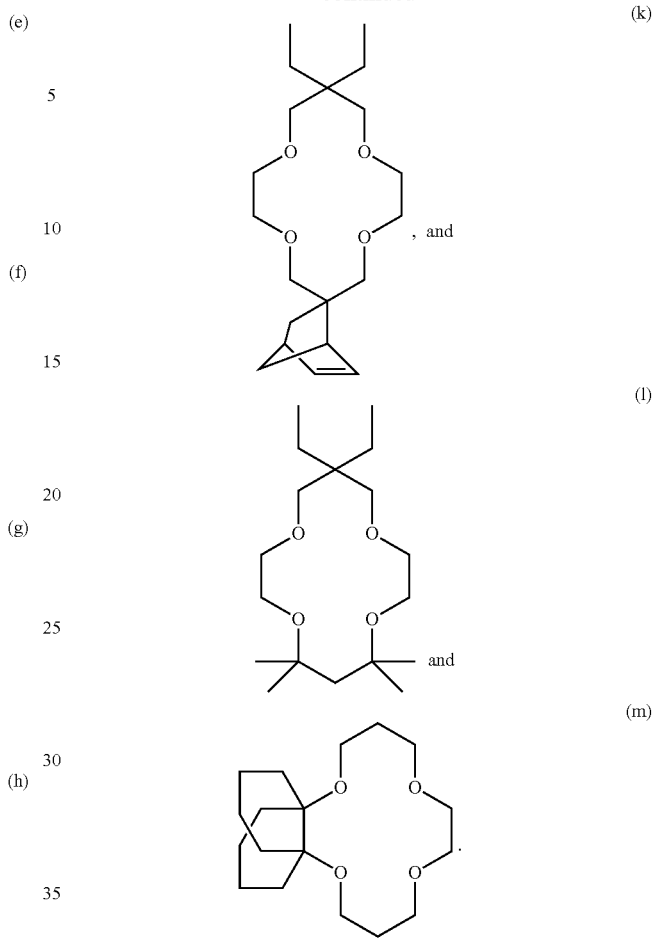

Exemplary electrolyte compositions of the present invention include Li$^+$-[EMIM]$^+$[TFO]$^-$-12-crown-4; Li$^+$-[EMIM]$^+$[HCOO]$^-$-12-crown-4; Li$^+$-[EMIM]$^+$[TFSI]$^-$-12-crown-4; and Li$^+$-[EMIM]$^+$[TFO]$^-$-18-crown-6.

The metal cation, e.g., lithium or sodium, may be present at any suitable molar ratio with the chelator. In particular, the molar ratio of the metal cation to the chelator may range from 0.01:1 to 1:0.01, e.g., 0.1:1 to 1:0.1, 0.5:1 to 1:0.5, or 0.9:1 to 1:0.9, such as 1:1. With respect to other components in the electrolyte, the metal cation, e.g., lithium or sodium, may be present in any suitable concentration, e.g., 0.01 to 10 M or 0.1 to 4 M. In embodiments, the metal cation mole fraction in the electrolyte may be at most 0.8, e.g., at most 0.7, 0.6, 0.5, 0.4, 0.3, 0.2, 0.1 or 0.05.

EXAMPLES

Example 1—Structure Generation

We investigated four distinct polymer-in-ionic-liquid systems: Li$^+$-[EMIM]$^+$ with 1. [TFO]$^-$-12-crown-4, 2. [HCOO]$^-$-12-crown-4, 3. [TFSI]$^-$-12-crown-4, and 4. [TFO]$^-$-18-crown-6. To create a low-density non-overlapping initial structure, we placed Li$^+$, [EMIM]$^+$, [TFO]$^-$ (or [HCOO]$^-$/[TFSI]$^-$), and 12-crown-4 (or 18-crown-6), as shown in FIGS. 1A-1F, randomly on the vertices of a three-dimensional cubic grid.[19,20,22]

We focus on the molar fraction of Li$^+$[ANION]$^-$ equal to 0.5, which corresponds to the composition with the most negative $t^+_{Li}$ for these chemistries.[19] To such systems we add n ionophore molecules, n ranging from 0 to 150. For every composition, we generated four independent IL-lithium-salt-ionophore structures which we then used to compute averages and uncertainties as standard deviations among such ensembles.

Molecular Dynamics

All molecular dynamics (MD) simulations have periodic boundary conditions and were performed using the Large-scale Atomic/Molecular Massively Parallel Simulator (LAMMPS).[23] We adopt the All-Atom Optimized Potentials for Liquid Simulation (OPLS-AA) force-field to model the atomic interactions.[24,25] Following the established practice in the ionic liquid literature, in this work we rescale the point charges assigned to every atomic species, to 80% of the original value, with the aim to mimic the average charge screening due to polarization, and charge transfer effects.[26-28] The cost-effective charge-rescaling is adopted in the literature in favor of polarizable models, as for instance self-consistent inducible dipoles[29] or Drude oscillators,[30] since their positive gains are counterbalanced by a significant increase in computational cost and difficulty in parameterization. We chose OPLS-AA parameters and charge rescaling for the ionic liquid species.[26,31,32] For consistency, we used the same choice of force-field for the ionophores, and the parameters were obtained from the official Jorgensen OPLS-AA distribution.[33-35] We used a timestep of t=1:0 fs in the velocity-Verlet algorithm to evolve the equation of motions. Nosé-Hoover barostat (1000 t coupling) and thermostat (100 t coupling) enforced pressure and temperature, respectively.[36-38] Following the structure generation, to overcome local energy barriers in search of lower energy minima, we adopted an equilibration procedure comprising a set of energy minimizations, compression/decompression, and annealing stages.[19,20]

We present a summary of the number of molecules and total number of atoms for every composition in Tables 1-4, with the ionic liquid OPLS-AA parameters taken from ref. 32 and the ionophore OPLS-AA parameters takes from refs. 33-35. The stages used to equilibrate the generated structures are described in Table 5.

TABLE 1

Total number of atoms and molecules for the $Li^+[EMIM]^+[TFO]^-$-12-crown-4 system.

| $X_{LiTFO}$ | $Li^+$ | $[EMIM]^+$ | $[TFO]^-$ | 12-crown-4 | Total # atoms |
|---|---|---|---|---|---|
| 0.5 | 97 | 97 | 194 | 0 | 3492 |
| | | | | 25 | 4192 |
| | | | | 50 | 4892 |
| | | | | 75 | 5592 |
| | | | | 100 | 6292 |
| | | | | 125 | 6992 |
| | | | | 150 | 7692 |

TABLE 2

Total number of atoms and molecules for the $Li^+[EMIM]^+[HCOO]^-$-12-crown-4 system.

| $X_{LiHCOO}$ | $Li^+$ | $[EMIM]^+$ | $[HCOO]^-$ | 12-crown-4 | Total # atoms |
|---|---|---|---|---|---|
| 0.5 | 125 | 125 | 250 | 0 | 3500 |
| | | | | 25 | 4200 |
| | | | | 50 | 4900 |
| | | | | 75 | 5600 |
| | | | | 100 | 6300 |
| | | | | 125 | 7000 |

TABLE 3

Total number of atoms and molecules for the $Li^+[EMIM]^+[TFSI]^-$-12-crown-4 system.

| $X_{LiTFSI}$ | $Li^+$ | $[EMIM]^+$ | $[TFSI]^-$ | 12-crown-4 | Total # atoms |
|---|---|---|---|---|---|
| 0.5 | 70 | 70 | 140 | 0 | 3500 |
| | | | | 25 | 4200 |
| | | | | 75 | 5600 |
| | | | | 125 | 7000 |

TABLE 4

Total number of atoms and molecules for the $Li^+[EMIM]^+[TFO]^-$-18-crown-6 system.

| $X_{LiTFO}$ | $Li^+$ | $[EMIM]^+$ | $[TFO]^-$ | 18-crown-6 | Total # atoms |
|---|---|---|---|---|---|
| 0.5 | 70 | 70 | 140 | 0 | 3492 |
| | | | | 25 | 4542 |
| | | | | 75 | 6642 |

TABLE 5

Stages used to equilibrate all the initial structures. The 13 stages are sequentially run. During heating/cooling and compression/decompression stages, the initial/final temperature/pressure is indicated in the table as "Initial → Final." The change in temperature/pressure is performed at a constant rate over the entire duration of the stage.

| Stage | Stage duration (ns) | Total time (ns) | Temp. (K) | Pressure (MPa) |
|---|---|---|---|---|
| Energy Minimization | — | — | — | — |
| NVT | 0.50 | 0.50 | — | — |
| Energy Minimization | — | — | — | — |
| NPH (compression) | 0.50 | 1.00 | — | 0 → 40 |
| NPT | 0.40 | 1.40 | 278 | 40 |
| NPT (decompression) | 0.60 | 2.00 | 278 | 40 → 0 |
| NPT (heating) | 0.40 | 2.40 | 278 → 368 | 0 → 10 |
| NPT (cooling) | 0.40 | 2.80 | 368 → 278 | 10 → 0.1 |
| NPT (compression) | 0.30 | 3.10 | 278 | 0.1 → 40 |
| NPT (decompression) | 0.30 | 3.40 | 278 | 40 → 0.1 |
| NVT | 0.80 | 4.20 | 278 | — |
| NPT (heating) | 1.00 | 5.20 | 278 → 358 | 0.1 |
| NPT | 2.00 | 7.20 | 358 | 0.1 |

Example 2—Transport Properties

To compute transport properties, we evolved every system for 60 ns in the canonical ensemble. The volume was kept equal to that of the last stage of the equilibration routine, and the temperature was maintained constant at 358K. Throughout the simulations the position of the center of mass of the three charged species in a given structure was recorded every 10 k$\delta$t=10 ps for post-processing. We analyzed the trajectories using the position correlation function modification[20] of the Wheeler-Newman approach,[39] which yields transport properties that account for the intra- and inter-species correlation. While it required longer trajectories to converge (as compared to standard mean squared displacement method), the adoption of fully correlated transport theory was a vital step to uncover transport anomalies such as a negative $t^+_{Li}$, which are otherwise impossible to find with a dilute solution theory approach.[19,20] The center of mass of the entire system is our choice of reference position, as there was no single species that could be treated as a "solvent." The effective lithium charge, $q^\varepsilon_{Li}$ hereafter, was computed as shown in Eq. 1.[19]

$$q^\varepsilon_{Li} = \text{Sign}\,(t^+_{Li})\sqrt{\frac{K_B T_K^{UC}|t^+_{Li}|}{e^2 n_{Li} D_{Li}}} \quad (1)$$

Example 3—Density and Radial Distribution Functions

Figure 2A:
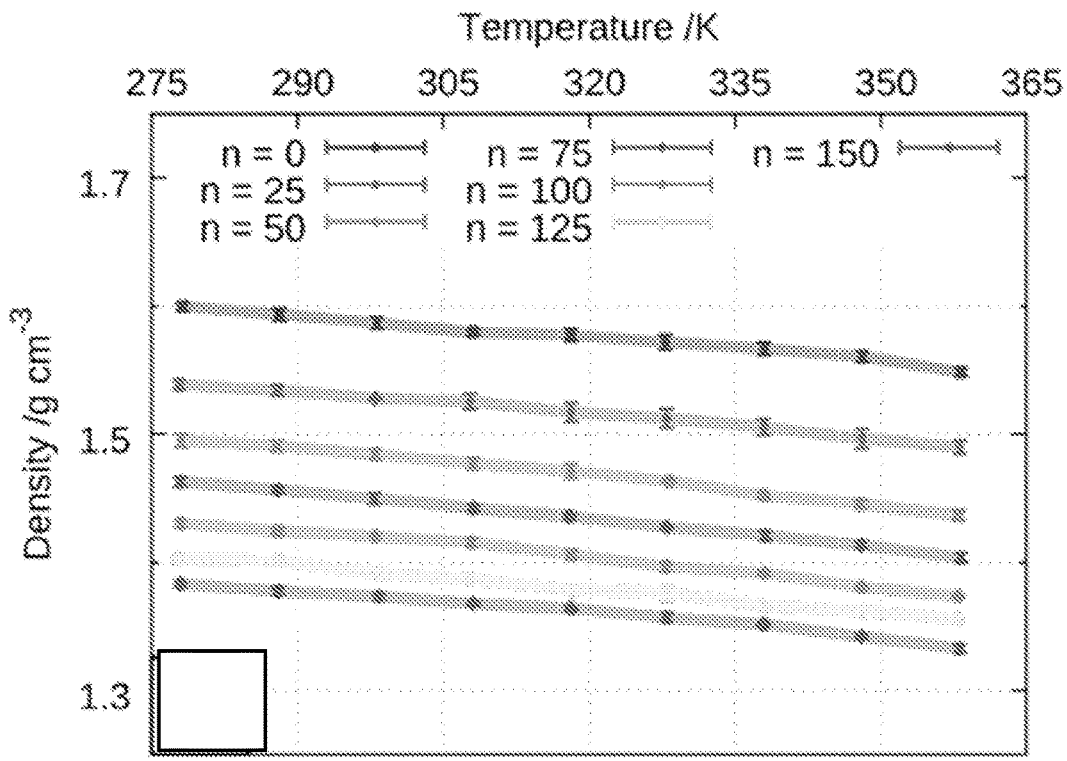
FIGS. 2A-2B: Density plots for the Li$^+$[EMIM]$^+$[TFO]$^-$-12-crown-4 and the Li$^+$[EMIM]$^+$[HCOO]$^-$-12-crown-4 systems.
Figure 2B:
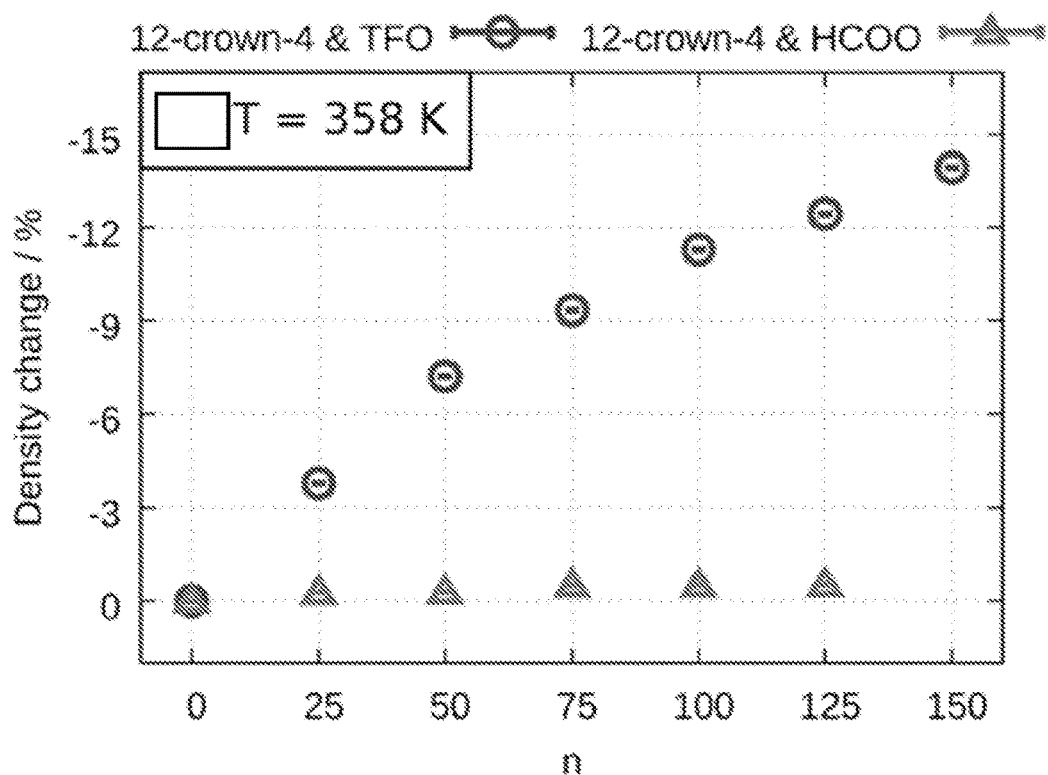

We methodically characterized the Li$^+$[EMIM]$^+$[TFO]$^-$ and Li$^+$[EMIM]$^+$[HCOO]$^-$ systems by computing the density at different temperature values ranging from 278K to 358K at steps of 10K. FIGS. 2A-2B summarize the density vs. temperature results for Li$^+$[EMIM]$^+$[TFO]$^-$-12-crown-4 (FIG. 2A), and the density percent difference vs. system composition at 358K (FIG. 2B). We observed a decrease in the density for the [TFO]$^-$ system with the addition of 12-crown-4 molecules as compared to the pure Li$^+$-salt-ionic liquid system. From n=25 to n=150 the density decreases further, at a progressively slower rate. The same qualitative trend of decreasing density with the addition of 12-crown-4 molecules was observed for [HCOO]$^-$, albeit to a different extent.

FIGS. 3A-3D show the Li$^+$-oxygen (from either [TFO]$^-$ (FIGS. 3A, 3C) or 12-crown-4, (FIGS. 3B, 3D)) radial distribution function (RDF) to explore the structural equilibrium properties of the [TFO]$^-$ system. FIGS. 3A and 3B show the RDF curves for three different electrolyte compositions, while the FIGS. 3C and 3D shows the differences in the RDFs. For all curves, the shaded area indicates the uncertainty, computed as the standard deviation on the ensemble of structures sharing the same composition (and propagated in the case of the bottom row). We observed that even for large numbers of inserted 12-crown-4 molecules, the location of the RDF extrema (both peaks and minima) remained substantially unaltered, indicating minimal structural changes. In particular, the first RDF minima, necessary for the Li$^+$[TFO]$^-$ cluster analysis, was found at approximately 2.85 Å. Looking at the RDF differences in FIGS. 3C and 3D, we observed that the intensity of the peak corresponding to [TFO]$^-$-oxygen coordination is reduced for increasing number of added 12-crown-4 molecules. This observation indicated that the 12-crown-4 molecules compete with the [TFO]$^-$ anion molecules to coordinate the lithium atoms. Consequently, we expect the 12-crown-4 molecules to profoundly alter the Li$^+$[TFO]$^-$ clustering and, ultimately, have an impact on the transport properties of such systems.

Example 4—Li$^+$-[TFO]$^-$ Clustering

The molecular resolution of our simulations allowed us to analyze the Li$^+$[TFO]$^-$ cluster population, and thereby help understand the role of the 12-crown-4 molecules in breaking the Li$^+$-anion coordination. After the equilibration routine, the structures were evolved for a total of 6.0 ns in the canonical ensemble, where the volume was set to the value obtained from the last stage of the equilibration routine, and temperature was 358K. Snapshots of the structures containing the positions of all atoms were saved every 100 $\delta$t=0.1 ps for post-processing. We analyzed clusters of Li$^+$ cations and [TFO]$^-$ anions by looking at their spatial correlation during the simulation, i.e., agglomerates where anions and cations are located nearby.[19,20] Li$^+$ and [TFO]$^-$ were iteratively grouped based on a threshold distance of 2.85 Å between Li$^+$ and oxygen atoms from [TFO]$^-$, corresponding to the first minima of their RDF. With $(C_i;A_j)^{i \cdot j}$ we denote a cluster comprising i Cations (Li$^+$), j Anions ([TFO]$^-$), and charge i-j. Therefore, with "positive cluster" and "negative cluster" we refer to configurations with i>j and i<j, respectively, with i and j integers greater or equal to zero. At every snapshot and for the four structures sharing the same composition, the type and number of appearances of every cluster was saved. The final reported cluster frequency is the ratio between the number of cluster appearances and the total number of appearances of all clusters.

In FIGS. 4A-4D, we present a graphical summary of our findings for $Li^+[EMIM]^+[TFO]^-$ with: 0 (FIG. 4A), and 150 (FIG. 4B) added 12-crown-4 molecules. The oblique, solid lines mark i=j, i.e., where neutral clusters with equal number of anions and cations would lie, and the vertical, dashed lines indicate the total number of $Li^+$ atoms in the systems, effectively acting as an upper bound to the number of cations in the clusters. As previously observed,[19] as shown in FIG. 4A, the system organizes in either small clusters or a single, large cluster comprising nearly all $Li^+$ atoms. Importantly, we notice that all clusters lie above the i=j line, indicating that all clusters are asymmetrical in nature, i.e., contain a greater number of anions than cations. The most common cluster composition is $(C_1;A_4)^{-3}$ with a total frequency of appearance of 15%.

The addition of 12-crown-4 molecules profoundly alters the coordination landscape, as shown in FIG. 4B. First, we observed that the 12-crown-4 molecules prevented the formation of a single cluster including all $Li^+$ atoms in the system, as the right panel of FIG. 4B is not populated. Second, on average the cluster population is closer to the i=j line, indicating neutral clusters, and, in particular, the most frequent cluster is now $(C_1;A_1)^0$ with 59% of recorded appearances. Third, positively-charged clusters are now possible and account for a non-trivial fraction of the total cluster population; for example, $(C_2;A_1)^1$ appears at 4%. Lastly, the system now contains 12% of $(C_1;A_0)_1$, i.e., $Li^+$ atoms that are completely not coordinated by any oxygen atoms from $[TFO]^-$. The cluster analysis provides an instantaneous picture of the $Li^+$ coordination, i.e., without considering time evolution and dynamics of the clusters, thus we now investigate the persistence of the $[TFO]^-$ coordination.

Example 5—Persistence of $Li^+$ Coordination

We want to study: 1. the persistence of the $Li^+$ coordination by the oxygen atoms from $[TFO]^-$, and 2. the relative contribution to the overall $Li^+$ coordination by the $[TFO]^-$ and the 12-crown-4 molecules. Here, we use the same MD trajectories as in the clustering analysis as in Example 4. The persistence for a lithium i, $\mathcal{P}$ (t), is defined as the fraction of oxygen atoms (from $[TFO]^-$) coordinating (i.e., within 2:85 Å) a $Li^+$ atom at time t that remains the same as at time 0, written as:[20,40,41]

$$\mathcal{P}^i(t) = \frac{G_0^i \cap G_t^i}{|G_0^i|} \quad (2)$$

where $G^i_0$ and $G^i_t$ are the sets containing the indices of the oxygen atoms coordinating $Li^+$ i at time 0 and t, respectively.

Figure 5A:
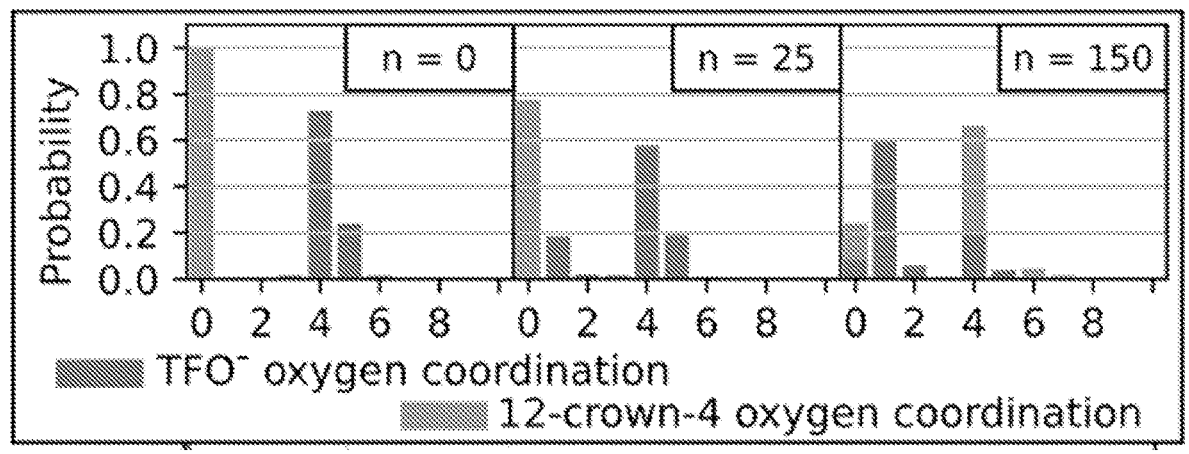
FIGS. 5A-5B: Persistence of the $Li^+$ coordination (exclusively oxygen atoms from [TFO]$^-$) as a function of time.
Figure 5B:
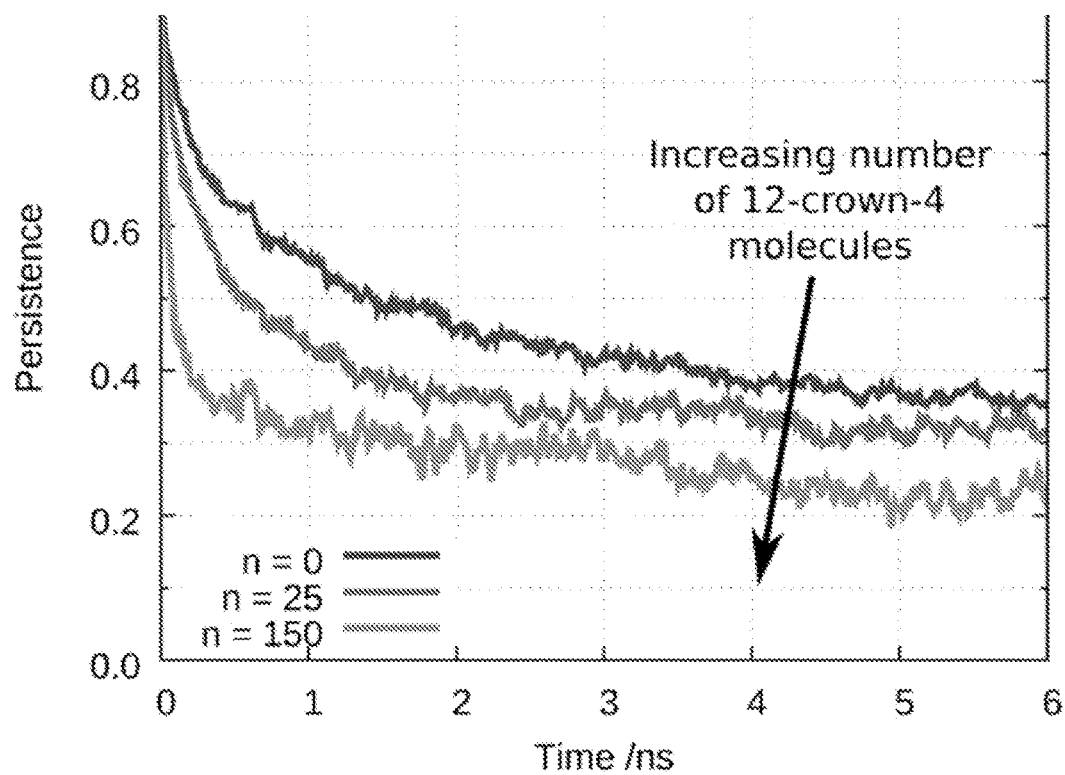

FIGS. 5A-5B show the persistence value over time, averaged over all the $Li^+$ atoms and structures with same concentration, for three different compositions. For all systems, the persistence starts at one, and it decays over time, meaning that the specific oxygen atoms contributing to the coordination change over time. We highlight that this behavior is different than in polymer electrolyte systems, where the cation coordination cage can remain unaltered over hundreds of nanoseconds.[42] Additionally, the persistence shows an interesting dependence on the number of added 12-crown-4 molecules. As is shown in FIG. 5B, going from n=0 to n=150, the persistence has a sharper initial drop, indicating that $Li^+$ coordination is renewed at a faster rate. Thus, the addition of 12-crown-4 molecules not only reduces the asymmetry in the $Li^+[TFO]^-$ cluster population, but also decreases the fraction of time lithium atoms spend coordinated by the same anion molecules. In other words, the competition between 12-crown-4 molecules and $[TFO]^-$ anion for coordinating $Li^+$ atoms reduced the cation-anion correlation. This result is promising for improving the transport properties, as a reduced $Li^+$-$[TFO]^-$ correlation should result in an increase in the lithium transference number.[19-21] Lastly, the coordination histograms shown in FIG. 5A reinforce the observation that the 12-crown-4 molecules compete with the $[TFO]^-$ anions to coordinate lithium.

Example 6—Transport Properties

FIGS. 6A-6D summarize the transport properties for all four ionic liquid-based electrolyte systems investigated here as a function of the number n of added ionophore molecules. The panels show:

(A) The total conductivity κ. For the $Li^+[EMIM]^+[TFO]^-$ systems we observe that the total conductivity increases by ~80% over the range of added 12-crown-4 molecules. On the other hand, we observe that for the $Li^+[EMIM]^+[HCOO]^-$ systems the total conductivity remains, within uncertainty, largely unaltered by the 12-crown-4 addition. Similar considerations apply to the other two systems. Whether the more significant decrease in density for $Li^+[EMIM]^+[TFO]^-$ than for $Li^+[EMIM]^+[HCOO]^-$ explains the observed difference in total conductivity is unclear. Since the focus of this work is on the decoupling of the Li+-anion motions, the origin of the observed differences in conductivity will be uncovered in a future study.

(B) The lithium transference number $t^+_{Li}$. $t^+_{Li}$ measures the relative contribution of the cation of interest to the total conductivity. We observed that the addition of ionophore molecules has a surprising, profound, and positive consequence on $t^+_{Li}$. The lithium transference number linearly increases the more ionophore molecules are added to the systems, even becoming positive in the case of $Li^+[EMIM]^+[TFO]^-$ (with both ionophores, circles and pointing-down triangles from FIGS. 6A-6D) and $Li^+[EMIM]^+[TFSI]+$ (diamonds from FIGS. 6A-6D). This result corroborates the importance of decoupling the cation and anion motion in order to increase $t^+_{Li}$, and suggests a general recipe to increase the fraction of conductivity carried by $Li^+$.

(C) The conductivity carried by lithium computed as $\kappa \cdot t^+_{Li}$. It is important to highlight that the charge/discharge rates of the electrolyte are controlled by the trade-off between $t^+_{Li}$ and total ionic conductivity: a high $t^+_{Li}$ with a low conductivity is as technologically impractical as the opposite. As a consequence, $\kappa_{Li}$ is often regarded as a good practical indicator for electrolyte optimization. Since, as a function of added ionophore molecules, the total conductivity is either not affected or increased, and the lithium transference number increased, also $\kappa_{Li}$ shows an overall increasing trend.

(D) The lithium effective charge $q^\varepsilon_{Li}$ calculated as in Eq. 1. The lithium atom at the center of a given cluster can diffuse together with any number ranging from all to none of the surrounding coordinating anions. Thus, $q^\varepsilon_{Li}$ provides an average picture, both over time and Li+ atoms, of the charge carried by the lithium-containing clusters. We observe an increase in $q^\varepsilon_{Li}$ for all systems, albeit more modest in Li+[EMIM]+[HCOO]− than in Li+[EMIM]+[TFO]−, for instance. We attribute this to lower increase in transference number, and to the approximately constant density, implying that the lithium number density, $n_{Li}$ in Eq. 1, also is maintained approximately constant. Finally, we note that $q^\varepsilon_{Li}$ for the Li+[EMIM]+[TFO]− (12-crown-4, n=150) system is still far from unity, indicating Li+ movement is not yet completely decoupled from that of the anion, as also shown by $t^+_{Li}$ being far equal to unity as shown in FIG. 6B.

Figure 7:
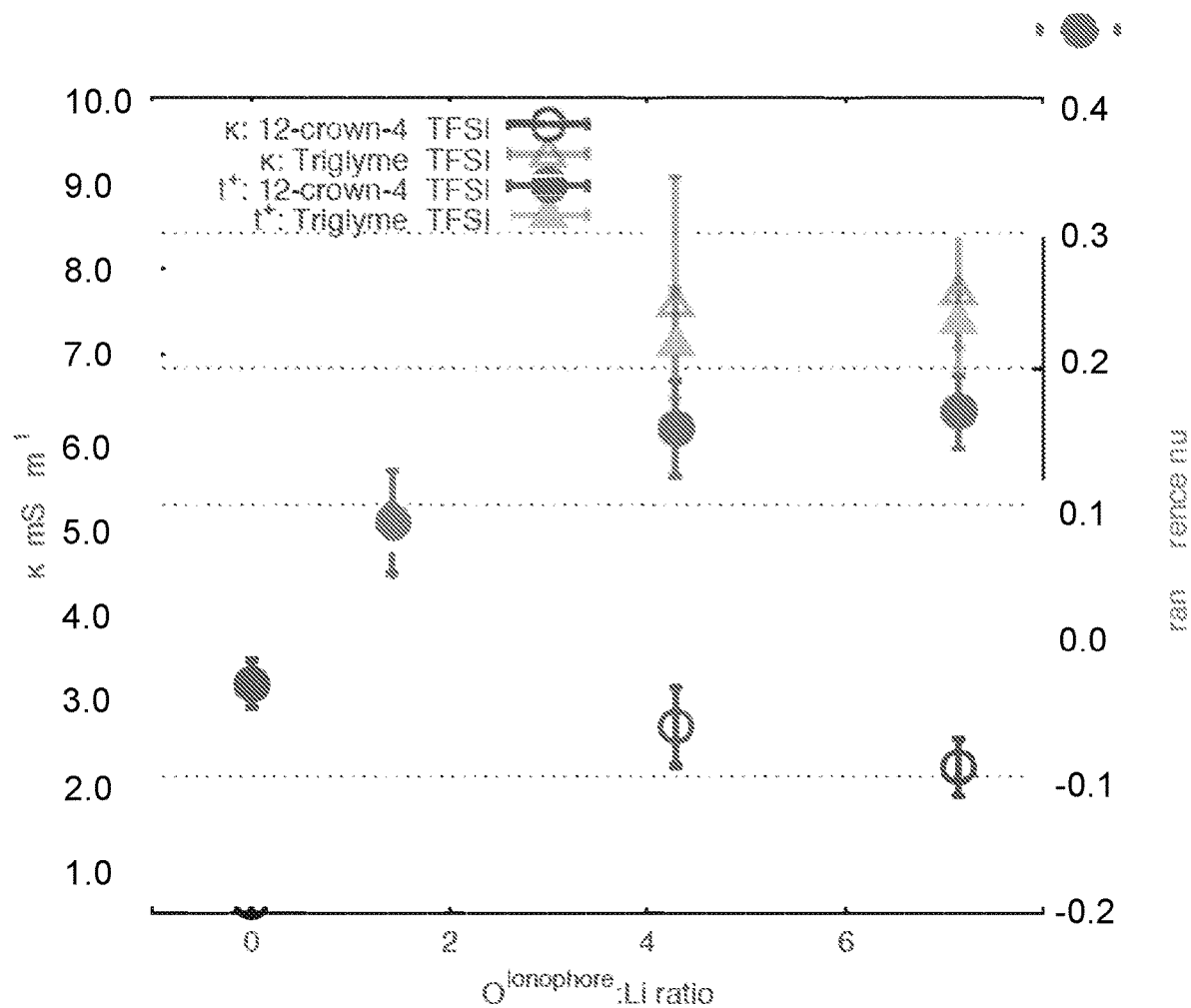
FIG. 7: Comparison of transport properties with 12-crown-4 and triglyme.

FIG. 7 shows the transport properties of Li+[TFSI]− with a podand (triglyme) compared to Li+[TFSI]− with a crown ether with equal number of O atoms (12-crown-4) across an increasing series of $O^{Ionophore}$ to Li ratios. The triglyme system shows both greater total conductivity κ and lithium transference number $t^+_{Li}$ than the equivalent crown ether. The gap widens with increasing $O^{Ionophore}$ to Li ratio.

REFERENCES (1) Rogers, R. D.; Seddon, K. R. Ionic liquids-solvents of the future? Science 2003, 302, 792-793.
(2) Welton, T. Room-temperature ionic liquids. Solvents for synthesis and catalysis. Chemical reviews 1999, 99, 2071-2084.
(3) Olivier-Bourbigou, H.; Magna, L.; Morvan, D. Ionic liquids and catalysis: Recent progress from knowledge to applications. Applied Catalysis A: General 2010, 373, 1-56.
(4) van Rantwijk, F.; Sheldon, R. A. Biocatalysis in ionic liquids. Chemical reviews 2007, 107, 2757-2785.
(5) Wasserscheid, P.; Keim, W. Ionic liquids: new solutions for transition metal catalysis. Angewandte Chemie International Edition 2000, 39, 3772-3789.
(6) Armand, M.; Endres, F.; MacFarlane, D. R.; Ohno, H.; Scrosati, B. Materials for Sustainable Energy: A Collection of Peer-Reviewed Research and Review Articles from Nature Publishing Group; World Scientific, 2011; pp 129-137.
(7) Dokko, et al. Solvate ionic liquid electrolyte for Li—S batteries. Journal of The Electrochemical Society 2013, 160, A1304-A1310.
(8) Xu, K. Nonaqueous liquid electrolytes for lithium-based rechargeable batteries. Chemical reviews 2004, 104, 4303-4418.
(9) Zakeeruddin, S. M.; Grätzel, M. Solvent-free ionic liquid electrolytes for mesoscopic dye-sensitized solar cells. Advanced Functional Materials 2009, 19, 2187-2202.
(10) MacFarlane, D. R.; Tachikawa, N.; Forsyth, M.; Pringle, J. M.; Howlett, P. C.; Elliott, G. D.; Davis, J. H.; Watanabe, M.; Simon, P.; Angell, C. A. Energy applications of ionic liquids. Energy & Environmental Science 2014, 7, 232-250.
(11) Kim, T. Y.; Lee, H. W.; Stoller, M.; Dreyer, D. R.; Bielawski, C. W.; Ruoff, R. S.; Suh, K. S. High-performance supercapacitors based on poly (ionic liquid)-modified graphene electrodes. ACS nano 2010, 5, 436-442.
(12) Chen, Y.; Zhang, X.; Zhang, D.; Yu, P.; Ma, Y. High performance supercapacitors based on reduced graphene oxide in aqueous and ionic liquid electrolytes. Carbon 2011, 49, 573-580.
(13) Balducci, A.; Dugas, R.; Taberna, P.-L.; Simon, P.; Plee, D.; Mastragostino, M.; Passerini, S. High temperature carbon-carbon supercapacitor using ionic liquid as electrolyte. Journal of Power Sources 2007, 165, 922-927.
(14) Balducci, A.; Bardi, U.; Caporali, S.; Mastragostino, M.; Soavi, F. Ionic liquids for hybrid supercapacitors. Electrochemistry communications 2004, 6, 566-570.
(15) Olivier-Bourbigou, H.; Magna, L. Ionic liquids: perspectives for organic and catalytic reactions. Journal of Molecular Catalysis A: Chemical 2002, 182, 419-437.
(16) Balducci, A. Ionic liquids in Lithium-ion batteries. Topics in Current Chemistry 2017, 375, 20.
(17) Lewandowski, A.; Swiderska-Mocek, A. Ionic liquids as electrolytes for Li-ion batteries: An overview of electrochemical studies. Journal of Power sources 2009, 194, 601-609.
(18) Watanabe, M.; Thomas, M. L.; Zhang, S.; Ueno, K.; Yasuda, T.; Dokko, K. Application of ionic liquids to energy storage and conversion materials and devices. Chemical reviews 2017, 117, 7190-7239.
(19) Molinari, N.; Mailoa, J. P.; Kozinsky, B. General Trend of Negative Transference Number in Li Salt/Ionic Liquid Mixtures. 2019.
(20) Molinari, N.; Mailoa, J. P.; Craig, N.; Christensen, J.; Kozinsky, B. Transport Anomalies Emerging from Strong Correlation in Ionic Liquid Electrolytes. 2019.
(21) Gouverneur, M.; Schmidt, F.; Schonhoff, M. Negative effective Li transference numbers in Li salt/ionic liquid mixtures: does Li drift in the "Wrong" direction? Physical Chemistry Chemical Physics 2018, 20, 7470-7478.
(22) Fadel, E.; Faglioni, F.; Samsonidze, G.; Molinari, N.; Merinov, B. V.; Goddard III, W. A.; Grossman, J. C.; Mailoa, J. P.; Kozinsky, B. Effects of solvent-salt charge-transfer complexes on oxidative stability of Li-ion battery electrolytes. 2018.
(23) Plimpton, S. Fast parallel algorithms for short-range molecular dynamics. Journal of computational physics 1995, 117, 1-19.
(24) Jorgensen, W. L.; Tirado-Rives, J. The OPLS [optimized potentials for liquid simulations] potential functions for proteins, energy minimizations for crystals of cyclic peptides and crambin. Journal of the American Chemical Society 1988, 110, 1657-1666.
(25) Jorgensen, W. L.; Maxwell, D. S.; Tirado-Rives, J. Development and testing of the OPLS all-atom force field on conformational energetics and properties of organic liquids. Journal of the American Chemical Society 1996, 118, 11225-11236.
(26) Doherty, B.; Zhong, X.; Gathiaka, S.; Li, B.; Acevedo, O. Revisiting OPLS force field parameters for ionic liquid simulations. Journal of chemical theory and computation 2017, 13, 6131-6145.
(27) Mogurampelly, S.; Ganesan, V. Structure and Mechanisms Underlying Ion Transport in Ternary Polymer Electrolytes Containing Ionic Liquids. J. Chem. Phys. 2017, 146, 074902.
(28) Pal, T.; Beck, C.; Lessnich, D.; Vogel, M. Effects of Silica Surfaces on the Structure and Dynamics of Room-Temperature Ionic Liquids: A Molecular Dynamics Simulation Study. The Journal of Physical Chemistry C 2017, 122, 624-634.

(29) Borodin, O. Polarizable force field development and molecular dynamics simulations of ionic liquids. The Journal of Physical Chemistry B 2009, 113, 11463-11478.

(30) Schröder, C.; Steinhauser, O. Simulating polarizable molecular ionic liquids with Drude oscillators. The Journal of chemical physics 2010, 133, 154511.

(31) Sambasivarao, S. V.; Acevedo, O. Development of OPLS-AA force field parameters for 68 unique ionic liquids. Journal of chemical theory and computation 2009, 5, 1038-1050.

(32) Acevedo, O. Ionic liquid force field parameters (OPLS-2009IL and OPLS-VSIL), GitHub.

(33) Jorgensen, W. L.; Tirado-Rives, J. Potential energy functions for atomic-level simulations of water and organic and biomolecular systems. Proceedings of the National Academy of Sciences 2005, 102, 6665-6670.

(34) Dodda, L. S.; Vilseck, J. Z.; Tirado-Rives, J.; Jorgensen, W. L. 1.14* CM1A-LBCC: localized bond-charge corrected CM1A charges for condensed-phase simulations. The Journal of Physical Chemistry B 2017, 121, 3864-3870.

(35) Dodda, L. S.; Cabeza de Vaca, I.; Tirado-Rives, J.; Jorgensen, W. L. LigParGen web server: an automatic OPLS-AA parameter generator for organic ligands. Nucleic acids research 2017, 45, W331-W336.

(36) Hoover, W. G. Canonical dynamics: equilibrium phase-space distributions. Physical review A 1985, 31, 1695.

(37) Nosé, S. A unified formulation of the constant temperature molecular dynamics methods. The Journal of chemical physics 1984, 81, 511-519.

(38) Hoover, W. G. Constant-pressure equations of motion. Physical Review A 1986, 34, 2499.

(39) Wheeler, D. R.; Newman, J. Molecular dynamics simulations of multicomponent diffusion. 1. Equilibrium method. J. Phys. Chem. B 2004, 108, 18353-18361.

(40) Molinari, N.; Angioletti-Uberti, S. Nanoparticle Organization Controls Their Potency as Universal Glues for Gels. Nano letters 2018, 18, 3530-3537.

(41) Molinari, N.; Sutton, A.; Mostofi, A. Mechanisms of reinforcement in polymer nanocomposites. Physical Chemistry Chemical Physics 2018, 20, 23085-23094.

(42) Webb, M. A.; Jung, Y.; Pesko, D. M.; Savoie, B. M.; Yamamoto, U.; Coates, G. W.; Balsara, N. P.; Wang, Z.-G.; Miller III, T. F. Systematic computational and experimental investigation of lithium-ion transport mechanisms in polyester-based polymer electrolytes. ACS central science 2015, 1, 198-205.

Other embodiments are in the claims.

What is claimed is:

1. An electrolyte comprising a Li cation, an ionic liquid, and a chelator that coordinates the Li cation; wherein the chelator is selected from the group consisting of optionally substituted $C_{8-20}$ crown ethers, optionally substituted $C_{8-20}$ azacrown ethers, optionally substituted $C_{8-20}$ thiacrown ethers, optionally substituted calix[n]arenes, and optionally substituted calix[n]crowns, wherein n is from 4-8; and further wherein the chelator coordinating the Li cation causes the transference number of the Li cation to become positive.

2. The electrolyte of claim 1, wherein the ionic liquid comprises N-alkylimidazolium, N-alkylpyridinium, N-alkylpyrrolidinium, or N-alkylammonium, N-alkylpiperidinium, alkylphosphonium, N-alkylpyrazinium, or a quaternary amine.

3. The electrolyte of claim 1, wherein the ionic liquid comprises 1-ethyl-3-methylimidazolium (EMIM), 1-butyl-3-methylimidazolium (BMIM), 1-hexyl-3-methylimidazolium (HMIM), or 1-methyl-3-propylimidazolium (MPIM).

4. The electrolyte of claim 1, wherein the ionic liquid comprises EMIM.

5. The electrolyte of claim 1, wherein the ionic liquid comprises a halide, $C_{1-6}$ carboxylate, triflate, chlorate, bistriflimide (TFSI⁻), bis(fluorosulfonyl)imide (FSI⁻), $PF_6^-$, $BF_4^-$, or N-alkylsulfate.

6. The electrolyte of claim 5, wherein the ionic liquid comprises triflate.

7. The electrolyte of claim 5, wherein the ionic liquid comprises formate.

8. The electrolyte of claim 1, wherein the chelator is one of lithium ionophores I-IV and VI-VIII or a species of formula (a) through (m):

(a)
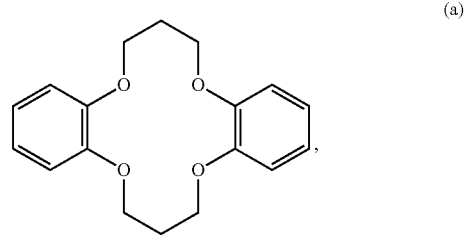

(b)
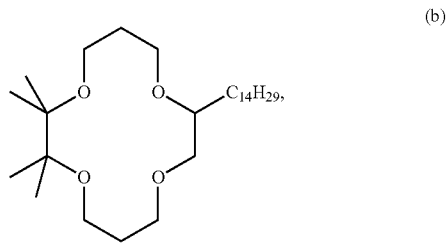

(c)
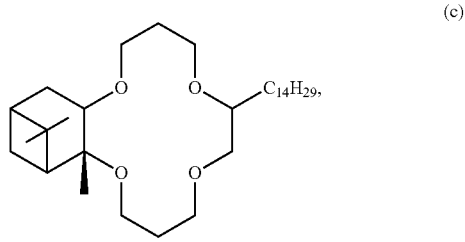

(d)
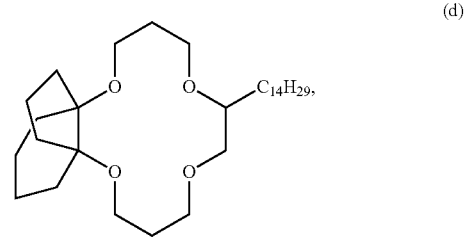

(e)
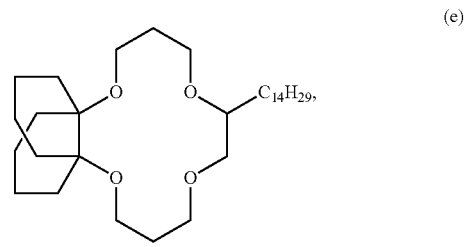

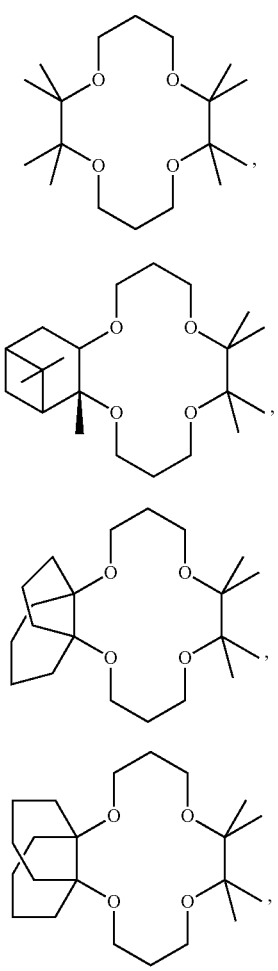

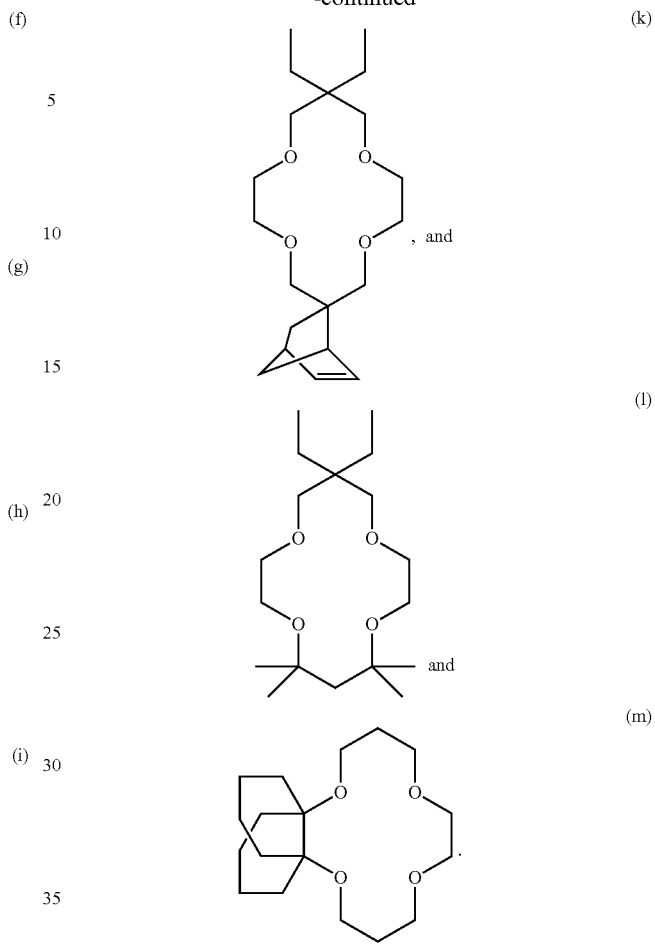

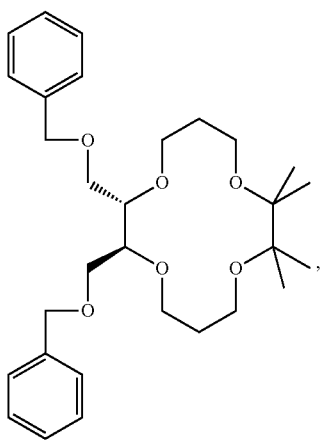

9. The electrolyte of claim 1, wherein the chelator is optionally substituted 12-crown-4, optionally substituted 18-crown-6, or optionally substituted 14-crown-4 or an azacrown or thiacrown derivative thereof.

10. The electrolyte of claim 1, wherein: the ionic liquid comprises EMIM and triflate; and the chelator is 12-crown-4.

11. The electrolyte of claim 1, wherein: the ionic liquid comprises EMIM and TFSI⁻; and the chelator is 12-crown-4.

12. The electrolyte of claim 1, wherein: the ionic liquid comprises EMIM and formate; and the chelator is 12-crown-4.

13. The electrolyte of claim 1, wherein: the ionic liquid comprises EMIM and triflate; and the chelator is 18-crown-6.

* * * * *